United States Patent
Nakao et al.

(10) Patent No.: US 7,412,014 B2
(45) Date of Patent: Aug. 12, 2008

(54) TIMING-ADJUSTING METHOD AND APPARATUS, AND DIVERSITY RECEIVING METHOD AND APPARATUS

(75) Inventors: Seigo Nakao, Gifu (JP); Nobuo Higashida, Moriguchi (JP)

(73) Assignees: Sanyo Electric Co., Ltd., Osaka (JP); NTT Data Sanyo System Corporation, Osaka (JP)

( * ) Notice: Subject to any disclaimer, the term of this patent is extended or adjusted under 35 U.S.C. 154(b) by 589 days.

(21) Appl. No.: 11/017,701

(22) Filed: Dec. 22, 2004

(65) Prior Publication Data

US 2005/0163261 A1    Jul. 28, 2005

(30) Foreign Application Priority Data

Dec. 26, 2003    (JP)   ............................. 2003-432118

(51) Int. Cl.
    *H04L 1/02*      (2006.01)
(52) U.S. Cl. ........................ 375/347; 375/145; 375/143; 375/149; 375/152; 375/316
(58) Field of Classification Search ................. 375/145, 375/143, 149, 152, 316, 340, 342, 343, 354, 375/365, 368
See application file for complete search history.

(56) References Cited

U.S. PATENT DOCUMENTS 6,377,613 B1 * 4/2002 Kawabe et al. .............. 375/142
6,711,221 B1 * 3/2004 Belotserkovsky et al. ... 375/355
6,731,622 B1 * 5/2004 Frank et al. ................. 370/342
7,054,353 B2 * 5/2006 Ostman et al. .............. 375/148

FOREIGN PATENT DOCUMENTS

JP      8-046659      2/1996

\* cited by examiner

*Primary Examiner*—Chieh M. Fan
*Assistant Examiner*—Siu M Lee
(74) *Attorney, Agent, or Firm*—McDermott Will & Emery LLP

(57) ABSTRACT

An A-D conversion unit performs analog-to-digital conversions on baseband signals. A correlation processing unit carries out a correlation processing. A power computing unit computes the power of correlation values. An inter-signal condition determining unit compares a relationship between the peak of a main signal and the peak of sub-signals to a first condition, and excludes, from combining diversity, baseband signals corresponding to the sub-signals if the relationship does not satisfy the first condition. An intra-signal condition determining unit 30 compares the main signals and sub-signals to a second condition, respectively, and excludes signals from combining diversity if the signals do not satisfy the second condition. A timing adjusting unit adjusts the timing of sub-signals so that the timing thereof comes close to the timing of the main signal. A shift unit shifts the timing of sampled signals corresponding to the sub-signals.

18 Claims, 8 Drawing Sheets

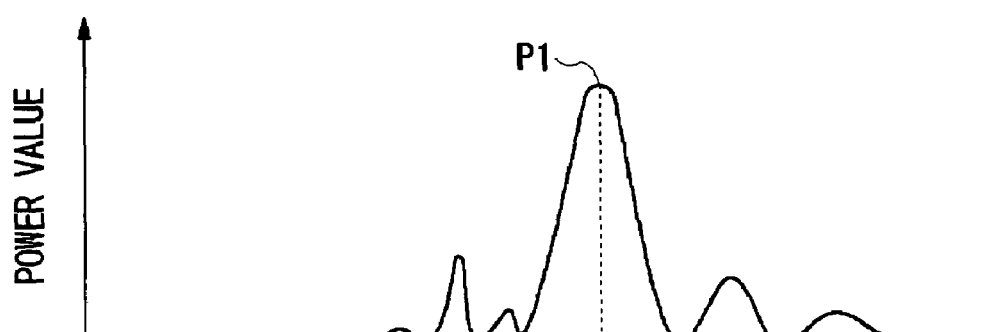
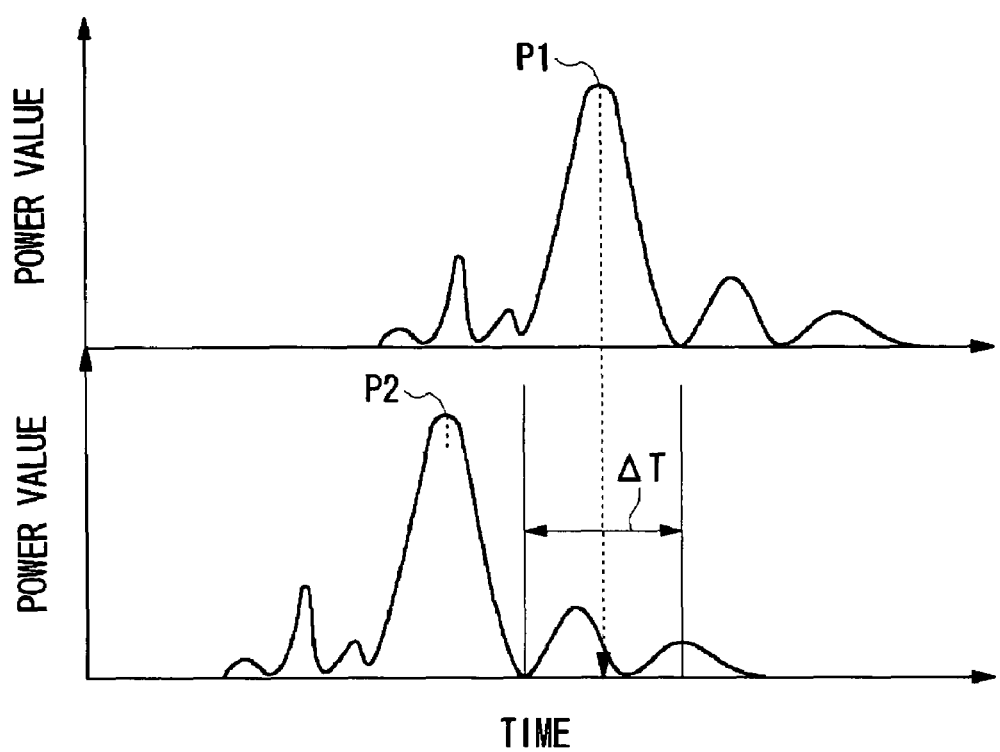

TIME

TIMING-ADJUSTING METHOD AND APPARATUS, AND DIVERSITY RECEIVING METHOD AND APPARATUS

BACKGROUND OF THE INVENTION

1. Field of the Invention

The present invention relates to the timing adjusting technologies, and it particularly relates to timing-adjusting method and apparatus and diversity receiving method and apparatus with which to adjust the timing of a plurality of signals received by a plurality of antennas so as to carry out the diversity reception.

2. Description of the Related Art

In digital radio communication, signals transmitted from a transmitting apparatus travel through radio propagation paths before they are received by a receiving apparatus. The receiving apparatus extracts information symbols, which are the object of transmission, from the signals received. In order to extract such information symbols accurately, the receiving apparatus must carry out extraction with a timing synchronized with the timing of the information symbols sent from the transmitting apparatus (hereinafter referred to as "synchronous timing"). Generally, a receiving apparatus, which is not informed of a synchronous timing from a transmitting apparatus, extracts one from the signals it has received. However, where the signals transmitted between a transmitting apparatus and a receiving apparatus are multi-carrier signals, application of an extraction method of synchronous timing for single-carrier signals may result in an increase in the amount of processing with the increase in the number of carriers. On the other hand, one of the methods for suppressing the amount of processing, which results from the extraction of synchronous timing for multi-carrier signals, is such that the correlation value between the pilot signal contained in the received signals and the pilot signal prepared beforehand is calculated and the timing when the peak of the correlation value is attained is extracted as the synchronous timing (See, for example, Reference (1) in the Related Art List below).

Related Art List (1) Japanese Patent Application Laid-Open No. Hei8-46659.

To improve the quality of signal transmission, a receiving apparatus may be provided with a plurality of antennas and a plurality of signals received by the plurality of antennas may be subjected to a diversity processing, or sometimes a combining diversity processing. In such a case, timing errors of the respective antennas may add up and, therefore, they are likely to lead to larger timing errors. If the difference in timing between antennas becomes large, the received signals rotates, and a combining diversity processing for the rotated signals may not result in any improvement in the transmission characteristics of signals. With multi-carrier signals, the rotation occurs with the sub-carriers, so that a combined diversity processing between sub-carriers with opposite phases may lead to a worsening of transmission characteristics of signals.

SUMMARY OF THE INVENTION

The present invention has been made in view of the foregoing circumstances and an object thereof is to provide a timing adjustment method and apparatus and a diversity receiving method and apparatus to correct timing errors contained in the signals received by a plurality of antennas.

A preferred embodiment according to the present invention relates to a timing adjusting apparatus. This apparatus comprises: a sampling unit which samples respectively a plurality of received signals at predetermined timings; a correlation processing unit which performs a correlation processing respectively on the plurality of sampled received signals by predetermined signals; a power computing unit which respectively computes power values of a main signal and sub-signals where one of the plurality of correlation-processed received signals is selected as the main signal and signals other than the main signal among the plurality of correlation-processed signals are the sub-signals; a detector which detects respectively a peak of the computed power value of the main signal and a peak of the computed power value of the sub-signals; an acquiring unit which acquires power values respectively corresponding to before and after the timing, from timing corresponding to the detected peak of the detected power value of the main signal, and which acquires power values respectively corresponding to before and after the timing, from timing corresponding to the detected peak of the power value of the sub-signals; a derivation unit which derives, based on the respective power values acquired by the acquiring unit, a first value indicating the degree of agreement between timings of the main signal and the sub-signals and a second value indicating the degree of variance between the timings of the main signal and the sub-signals; and a shift unit which shifts timing of received signals corresponding to the sub-signals, among the plurality of sampled received signals, based on the second value derived by the derivation unit if the derived second value is greater than the first value.

By employing the above apparatus, the degree of agreement or variance between timings of the main signal and the sub-signal is derived based on the power values of the correlation-processed signals and then the shifting of timing is determined according to the magnitudes of those derived values, so that the timing errors among a plurality of signals can be made smaller.

If power values at timings corresponding to before and after the timing of the peak are defined as a first power value and a second power value, respectively, and power values for the sub-signals at timings corresponding to before and after the timing of the peak are defined as a third power value and a fourth power value, respectively, the derivation unit may derive the first value and the second value where the first value is to become larger as the slope of a line between the third power value and the fourth power value agrees with the slope of a line between the first power value and the second power value and where the second value is to become larger as the slope thereof is reversed. The derivation unit may derive, as the first value, the absolute value of a result in which the second power value and the fourth power value are subtracted from the sum of the first power value and the third power value, and may derive, as the second value, the absolute value of a result in which the second power value and the third power value are subtracted from the sum of the first power value and the fourth power value, and the shift unit may shift timing of received signals corresponding to the sub-signals, based on the magnitude of the sum of the first power value and the fourth power value and the magnitude of the sum of the second power value and the third power value among the second values derived.

The shift unit may shift the timing corresponding to the sub-signals to an after-timing if a value obtained after an operation has been done to the sum of the second power value and the third power value is smaller than the sum of the first power value and the fourth power value whereas the shift unit may shift the timing corresponding to the sub-signals to a before-timing if a value obtained after an operation has been done to the sum of the first power value and the fourth power value is smaller than the sum of the second power value and the third power value.

The shift unit may process, as an invalid signal, a received signal corresponding to the sub-signal if the absolute value of a result obtained in a manner such that the value obtained after an operation has been done to the sum of the second power value and the third power value is subtracted from the sum of the first power value and the fourth power value or a result obtained in a manner such that the value obtained after an operation has been done to the sum of the first power value and the fourth power value is subtracted from the sum of the second power value and the third power value is smaller than a predetermined value.

Another preferred embodiment according to the present invention relates to a diversity receiving apparatus. This apparatus comprises: a sampling unit which samples respectively a plurality of received signals at predetermined timings; a correlation processing unit which performs a correlation processing respectively on the plurality of sampled received signals by predetermined signals; a power computing unit which respectively computes power values of a main signal and sub-signals where one of the plurality of correlation-processed received signals is selected as the main signal and signals other than the main signal among the plurality of correlation-processed signals are the sub-signals; a detector which detects respectively a peak of the computed power value of the main signal and a peak of the computed power value of the sub-signals; an inter-signal condition determining unit which excludes, from signals on which diversity is to be performed, a received signal corresponding to the sub-signal if a relation of the detected peak of the power value of the main signal and the detected peak of the power value of the sub-signals does not satisfy a first condition; an intra-signal condition determining unit which compares the peak of the computed power value of the main signal and the peak of the computed power value of the sub-signals to a second condition, respectively, if a received signal corresponding to the sub-signal is not excluded from signals on which diversity is to be performed and which excludes, from signals on which diversity is to be performed, a signal corresponding to the main signal or the sub-signal if there is the main signal or the sub-signal that does not satisfy the second condition; a timing adjusting unit which adjusts the timing of a received signal, among the plurality of sampled received signals, corresponding to the sub-signal if received signals corresponding to the main signal and the sub-signal are not excluded from signals on which diversity is to be performed; and a diversity processing unit which performs a diversity processing on a received signal corresponding to the main signal and a timing-adjusted received signal, among the plurality of sampled received signals.

The "diversity" includes not only combining or synthesizing signals received by a plurality of antennas but also combining or synthesis based on adaptive weight vectors such as an adaptive array processing. Here the "diversity" is defined on the assumption that it includes a processing of signals received by a plurality of antennas.

By employing the above apparatus, signals are compared to a predetermined condition among the signals and within a signal and those which do not satisfy a condition are excluded from diversity candidates. Thus, the effect of signals which do not contribute to the possible improvement of the characteristics can be prevented, independently of whether the sampling timings are synchronous or not.

The inter-signal condition determining unit may specify, as the first condition, that a time difference between timing corresponding to the detected peak of the power value of the main signal and timing of the detected peak of the power value of the sub-signal is equal to or less than a predetermined power value. The inter-signal condition determining unit may specify, as the first condition, that a ratio of a power value corresponding to the detected peak of the power value of the sub-signal to a power value corresponding to the detected peak of the power value of the main signal is equal to or greater than a predetermined power ratio. The intra-signal condition determining unit may specify, as the second condition, that ratios of power values, for the main signal or the sub-signal, corresponding respectively to before- and after-timings of the timing of a peak to the power value at the peak are equal to or less than a predetermined power value.

The timing adjusting unit may include: an acquiring unit which acquires power values respectively corresponding to before and after the timing, from timing corresponding to the peak of the detected power value of the main signal, and which acquires power values respectively corresponding to before and after the timing, from timing corresponding to the peak of the detected power value of the sub-signals; a derivation unit which derives, based on the respective power values acquired by the acquiring unit, a first value indicating the degree of agreement between timings of the main signal and the sub-signals and a second value indicating the degree of variance between the timings of the main signal and the sub-signals; and a shift unit which shifts timing of received signals corresponding to the sub-signals, among the plurality of sampled received signals, based on the second value derived by the derivation unit if the derived second value is greater than the first value.

Still another preferred embodiment according to the present invention relates to a timing adjusting method. This method comprises: sampling respectively a plurality of received signals at predetermined timings; performing a correlation processing respectively on the plurality of sampled received signals by predetermined signals; computing respectively power values of a main signal and sub-signals where one of the plurality of correlation-processed received signals is selected as the main signal and signals other than the main signal among the plurality of correlation-processed signals are the sub-signals; detecting respectively a peak of the computed power value of the main signal and a peak of the computed power value of the sub-signals; acquiring power values respectively corresponding to before and after the timing, from timing corresponding to the detected peak of the power value of the main signal, and acquiring power values respectively corresponding to before and after the timing, from timing corresponding to the detected peak of the power value of the sub-signals; deriving, based on the respective power values acquired by the acquiring, a first value indicating the degree of agreement between timings of the main signal and the sub-signals and a second value indicating the degree of variance between the timings of the main signal and the sub-signals; and shifting timing of received signals corresponding to the sub-signals, among the plurality of sampled received signals, based on the second value derived by the deriving if the derived second value is greater than the derived first value.

When power values at timings corresponding to before and after the timing of the peak for a main signal are defined as a first power value and a second power value, respectively, and power values at timings corresponding to before and after the timing of the peak for a sub-signal are defined as a third power value and a fourth power value, respectively, the deriving may be such that the first value, which is to become larger as the slope of a line between the third power value and the fourth power value agrees with the slope of a line between the first power value and the second power value, and the second value, which is to become larger as the slope thereof is reversed, are derived. The deriving may be such that the absolute value of a result in which the second power value and the fourth power value are subtracted from the sum of the first power value and the third power value is derived as the first value and the absolute value of a result in which the second power value and the third power value are subtracted from the first power value and the fourth power value is derived as the second value, and the shifting may be such that timing of received signals corresponding to the sub-signals are shifted based on the magnitude of the sum of the first power value and the fourth power value and the magnitude of the sum of the second power value and the third power value among the second values derived.

The shifting may be such that the timing corresponding to the sub-signals is shifted to an after-timing if a value obtained after an operation has been done to the sum of the second power value and the third power value is smaller than the sum of the first power value and the fourth power value whereas the timing corresponding to the sub-signals is shifted to a before-timing if a value obtained after an operation has been done to the sum of the first power value and the fourth power value is smaller than the sum of the second power value and the third power value.

The shifting may be such that a received signal corresponding to the sub-signal is processed as an invalid signal if the absolute value of a result obtained in a manner such that the value obtained after an operation has been done to the sum of the second power value and the third power value is subtracted from the sum of the first power value and the fourth power value or a result obtained in a manner such that the value obtained after an operation has been done to the sum of the first power value and the fourth power value is subtracted from the sum of the second power value and the third power value is smaller than a predetermined value.

Still another preferred embodiment according to the present invention relates to a diversity receiving method. This method comprises: sampling respectively a plurality of received signals at predetermined timings; performing a correlation processing respectively on the plurality of sampled received signals by predetermined signals; computing respectively power values of a main signal and sub-signals where one of the plurality of correlation-processed received signals is selected as the main signal and signals other than the main signal among the plurality of correlation-processed signals are the sub-signals; detecting respectively a peak of the computed power value of the main signal and a peak of the computed power value of the sub-signals; excluding, from signals on which diversity is to be performed, a received signal corresponding to the sub-signal if a relation of the detected peak of the power value of the main signal and the detected peak of the power value of the sub-signals does not satisfy a first condition; comparing the peak of the computed power value of the main signal and the peak of the computed power value of the sub-signals to a second condition, respectively, if a received signal corresponding to the sub-signal is not excluded from signals on which diversity is to be performed and excluding, from signals on which diversity is to be performed, a signal corresponding to the main signal or the sub-signal if there is the main signal or the sub-signal that does not satisfy the second condition; adjusting the timing of a received signal, among the plurality of sampled received signals, corresponding to the sub-signal if received signals corresponding to the main signal and the sub-signal are not excluded from signals on which diversity is to be performed; and performing a diversity processing on a received signal corresponding to the main signal and a timing-adjusted received signal, among the plurality of sampled received signals.

The excluding, from signals on which diversity is to be performed, a received signal corresponding to the sub-signal may be such that it is specified as the first condition that a time difference between timing corresponding to the detected peak of the power value of the main signal and timing of the detected peak of the power value of the sub-signal is equal to or less than a predetermined power value. The excluding, from signals on which diversity is to be performed, a received signal corresponding to the main signal or the sub-signal may be such that it is specified as the first condition that a ratio of a power value corresponding to the detected peak of the power value of the sub-signal to a power value corresponding to the detected peak of the power value of the main signal is equal to or greater than a predetermined power ratio. The excluding, from signals on which diversity is to be performed, a received signal corresponding to the main signal or the sub-signal may be such that it is specified as the second condition that ratios of power values, for the main signal or the sub-signal, corresponding respectively to before- and after-timings of the timing of a peak to the power value at the peak are equal to or less than a predetermined power ratio.

The adjusting the timing may include acquiring power values respectively corresponding to before and after the timing, from timing corresponding to the peak of the detected power value of the main signal, and acquiring power values respectively corresponding to before and after the timing, from timing corresponding to the peak of the detected power value of the sub-signals; and deriving, based on the respective power values acquired by the acquiring, a first value indicating the degree-of agreement between timings of the main signal and the sub-signals and a second value indicating the degree of variance between the timings of the main signal and the sub-signals; and shifting timing of received signals corresponding to the sub-signals, among the plurality of sampled received signals, based on the second value derived by the deriving if the derived second value is greater than the derived first value.

Still another embodiment according to the present invention relates to a program. This program, executable by a computer, includes the functions of: sampling respectively a plurality of received signals at predetermined timings; performing a correlation processing respectively on the plurality of sampled received signals by predetermined signals; computing respectively power values of a main signal and sub-signals where one of the plurality of correlation-processed received signals is selected as the main signal and signals other than the main signal among the plurality of correlation-processed signals are the sub-signals, and storing the computed power values in a memory; detecting respectively a peak of the computed power value of the main signal and a peak of the computed power value of the sub-signals; acquiring, from the memory, power values respectively corresponding to before and after the timing, from timing corresponding to the detected peak of the power value of the main signal, and acquiring, from the memory, power values respectively corresponding to before and after the timing, from timing corresponding to the detected peak of the power value of the sub-signals; deriving, based on the respective power values acquired by the acquiring, a first value indicating the degree of agreement between timings of the main signal and the sub-signals and a second value indicating the degree of variance between the timings of the main signal and the sub-signals; and shifting timing of received signals corresponding to the sub-signals, among the plurality of sampled received signals, based on the second value derived by the deriving if the derived second value is greater than the first value.

Still another embodiment according to the present invention relates also to a program. This program, executable by a computer, includes the functions of: sampling respectively a plurality of received signals at predetermined timings; performing a correlation processing respectively on the plurality of sampled received signals by predetermined signals; computing respectively power values of a main signal and sub-signals where one of the plurality of correlation-processed received signals is selected as the main signal and signals other than the main signal among the plurality of correlation-processed signals are the sub-signals, and storing the computed power values in a memory; detecting respectively a peak of the computed power value of the main signal and a peak of the computed power value of the sub-signals; excluding from signals on which diversity is to be performed, a received signal corresponding to the sub-signal if a relation of the detected peak of the power value of the main signal and the detected peak of the power value of the sub-signals does not satisfy a first condition stored beforehand in the memory; comparing the peak of the computed power value of the main signal and the peak of the computed power value of the sub-signals to a second condition stored beforehand in the memory, respectively, after being outputted from the memory if a received signal corresponding to the sub-signal is not excluded from signals on which diversity is to be performed, and excluding, from signals on which diversity is to be performed, a signal corresponding to the main signal or the sub-signal if there is the main signal or the sub-signal that does not satisfy the second condition; adjusting the timing of a received signal, among the plurality of sampled received signals, corresponding to the sub-signal if received signals corresponding to the main signal and the sub-signal are not excluded from signals on which diversity is to be performed; and performing a diversity processing on a received signal corresponding to the main signal and a timing-adjusted received signal, among the plurality of sampled received signals.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIGS. 3A and 3B illustrate waveforms of signals to be processed by an inter-signal condition determining unit.

DETAILED DESCRIPTION OF THE INVENTION

Figure 1:
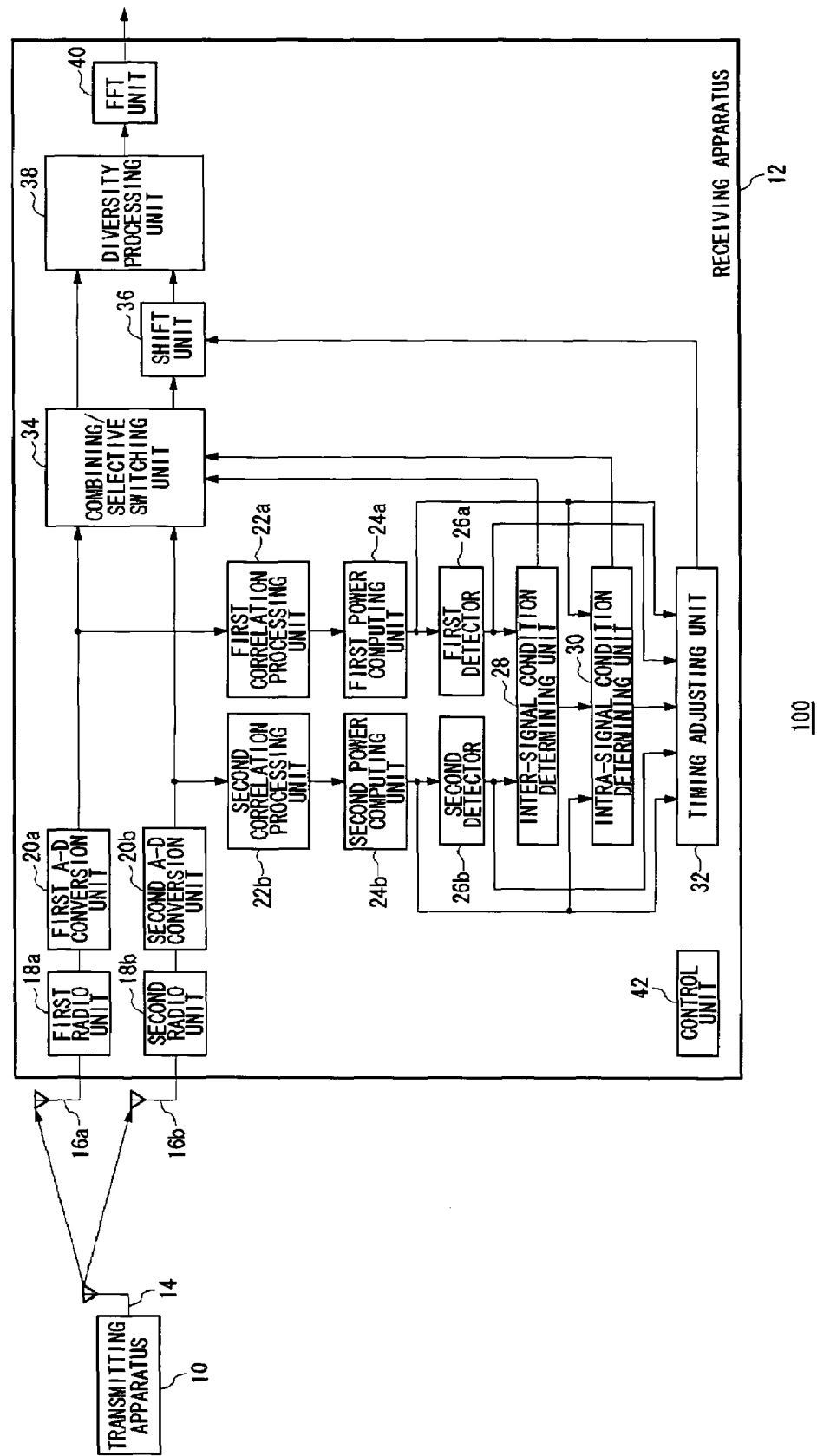
FIG. 1 shows a structure of a communication system according to a first embodiment of the present invention.

The invention will now be described based on the following embodiments which do not intend to limit the scope of the present invention but exemplify the invention. All of the features and the combinations thereof described in the embodiments are not necessarily essential to the invention.

In this patent specifications, the terms "combining" and "synthesizing" are used interchangeably.

First Embodiment

Before describing the present invention in a specific and detailed manner, its general outline will be described first. A first embodiment of the present invention relates to a receiving apparatus that receives signals transmitted from a transmitting apparatus with a plurality of antennas and subjects them to a diversity processing. The signals transmitted from a transmitting apparatus are assumed herein to be multi-carrier signals, which are, in particular, modulated by OFDM (Orthogonal Frequency Division Multiplexing). A receiving apparatus according to the present embodiment performs five stages of processing to the signals before FFT (Fast Fourier Transform). In the first stage, which corresponds to preprocessing, a plurality of received signals are sampled respectively and the power values therefor are computed by correlation processing of the sampled signals in relation to known signals. And the peaks of the power values are respectively detected in reference to the plurality of the correlation-processed signals.

In the second stage, comparison is made between the plurality of signals. That is, when the relation of waveforms of a plurality of correlated signals does not satisfy a first condition, the signal quality may deteriorate if the signals received in correspondence to them are synthesized. Therefore, in this stage, such a group of the plurality of received signals is excluded from the candidates for combining diversity. The third stage of processing is a comparison processing within a single signal. That is, if as a result of the second stage there are a plurality of received signals remaining as candidates for combining diversity, the received signals corresponding to those with which the waveforms of the correlated signals do not satisfy the second condition are excluded from the candidates for combining diversity.

The fourth stage is a processing to adjust the timing among signals. That is, if as a result of the third stage of processing there are a plurality of received signals remaining as candidates for combining diversity, the timing is adjusted according to the waveforms of the correlated signals. The fifth stage is a processing where a diversity processing is carried out. If a plurality of received signals are remaining as candidates for combining diversity, a combining diversity is performed. On the other hand, if a plurality of received signals are not remaining as candidates for combining diversity, a selective diversity will be performed.

The problems concerning diversity that can be solved by the present embodiment are as follows. For a combining diversity including adaptive array signal processing, the signals received by their respective antennas are synthesized, so that the transmission characteristics of the signals after the synthesis is affected by the quality of the signals received by their respective antennas. In particular, the transmission characteristics may vary greatly where there are differences in transmission delay with regard to the sampling timing of signals received by their respective antennas. Therefore, there may be cases where no improvement in the characteristics may be achieved by diversity when signals with widely varying sampling timings are synthesized. To solve such a problem, a structure according to the present embodiment is such that the signals with widely varying sampling timings are not synthesized and some of such the signals are excluded from diversity processing.

The terms used herein will now be explained. Since an OFDM modulation scheme is assumed in the present embodiments, signals having been subjected to IFFT (Inverse Fast Fourier Transform) at a transmitting apparatus are received by a receiving apparatus. A signal S(t) having undergone an N-point IFFT is expressed as:

$$S(t) = \sum_{n=0}^{N-1} \text{Re}\left\{Z_n \exp\left(\frac{j2\pi nt}{T}\right)\exp(j2\pi f_0 t)\right\} \quad \text{(Eq. 1)}$$

where $Z_n$ is an information component and $f_0$ is a carrier frequency. Here the time t at one point of IFFT is called an "FFT point". Also, an interval between "FFT points" is called an "FFT point interval". Furthermore, a guard interval is normally added to a signal having undergone an IFFT before it is transmitted, and a set of signals after an N-point IFFT, that is, a total of the size of the Fourier transform and the period of guard interval, is called an "OFDM symbol".

With multi-carrier signals, there is a phenomenon in which timing errors of signals received by a plurality of antennas rotate the phases of the received signals. And this phenomenon will be explained here. A signal transmitted from a transmitting apparatus may be expressed as:

$$S = A_1 \exp(j\omega_1 t) + A_2 \exp(j\omega_2 t) + \ldots + A_n \exp(j\omega_n t) \quad \text{(Eq. 2)}$$

It is assumed here that this signal is received by two antennas, and if their respective sampling errors are $\Delta t_1$ and $\Delta t_2$, the response vector from transmitting apparatus to antenna 1 is $h_1$ and that from transmitting apparatus to antenna 2 is $h_2$, then the two received signals $R_1$ and $R_2$ will be expressed as:

$$R_1 = h_1\{A_1 \exp(j\omega_1(t+\Delta t_1)) + A_2 \exp(j\omega_2(t+\Delta t_1)) + \ldots + A_n \exp(j\omega_n(t+\Delta t_1))\}$$

$$R_2 = h_2\{A_1 \exp(j\omega_1(t+\Delta t_2)) + A_2 \exp(j\omega_2(t+\Delta t_2)) + \ldots + A_n \exp(j\omega_n(t+\Delta t_2))\} \quad \text{(Eq. 3)}$$

It is assumed here that an adaptive array signal processing is performed, and if the receiving weight vectors are $w_1$ and $w_2$, then a composite signal y will be expressed as:

$$y = w_1 R_1 + w_2 R_2 \quad \text{(Eq. 4)}$$

$$= A_1\{w_1 h_1 \exp(j\omega_1 \Delta t_1) + w_2 h_2 \exp(j\omega_1 \Delta t_2)\} \cdot \exp(j\omega_1 t) +$$

$$A_2\{w_1 h_1 \exp(j\omega_2 \Delta t_1) + w_2 h_2 \exp(j\omega_2 \Delta t_2)\} \cdot \exp(j\omega_2 t) + \ldots +$$

$$A_n\{w_1 h_1 \exp(j\omega_n \Delta t_1) + w_2 h_2 \exp(j\omega_n \Delta t_2)\} \cdot \exp(j\omega_n t)$$

where $w_1 h_1$ and $w_2 h_2$ are real components and $\exp(j\omega_1 t)$ and the like attached at the end of each term will be removed upon demodulation, so that the phases will rotate when there is difference between $\Delta t_1$ and $\Delta t_2$.

FIG. 1 shows a communication system 100 according to a first embodiment. The communication system 100 includes a transmitting apparatus 10 and a receiving apparatus 12. The transmitting apparatus 10 includes a transmitting antenna 14. The receiving apparatus 12 includes a first receiving antenna 16a and a second receiving antenna 16b, which are generically called receiving antennas 16, a first radio unit 18a and a second radio unit 18b, which are generically called radio units 18, a first A-D conversion unit 20a and a second A-D conversion unit 20b, which are generically called A-D conversion units 20, a first correlation processing unit 22a and a second correlation processing unit 22b, which are generically called correlation-processing units 22, a first power computing unit 24a and a second power computing unit 24b, which are generically called power computing units 24, a first detector 26a and a second detector 26b, which are generically called detectors 26, an inter-signal condition determining unit 28, an intra-signal condition determining unit 30, a timing adjusting unit 32, combining/selective switching unit 34, a shift unit 36, a diversity processing unit 38, an FFT unit 40 and a control unit 42.

Figure 2:
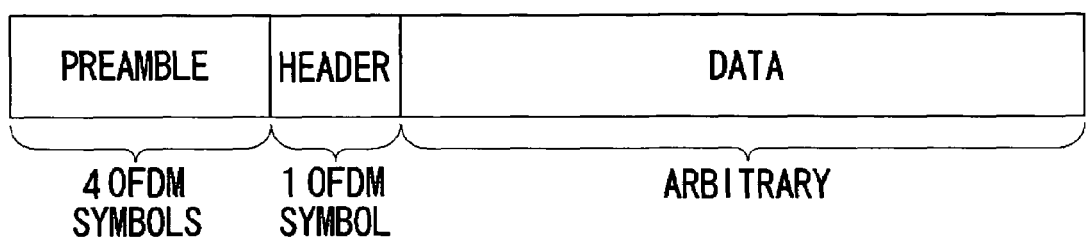
FIG. 2 shows a structure of a burst format according to a first embodiment of the present invention.

The transmitting apparatus 10 transmits signals from the transmitting antenna 14. The transmitting apparatus 10 includes an IFFT circuit because the signals transmitted are modulated by OFDM and, in particular, IEEE802.11a which is one of wireless LANs (Local Area Networks) is assumed as the communication system 100. FIG. 2 shows a structure of a burst format used in the first embodiment. This is the burst format used in the traffic channel. A preamble to be used mainly for timing synchronization and carrier recovery is placed in the four leading symbols of the burst.

Referring back to FIG. 1, the receiving antennas 16 are antennas for receiving signals transmitted from the transmitting apparatus 10. For the sake of simplicity, it is assumed here that one of the antennas is omnidirectional and the number of antennas is two.

The radio units 18 convert the signals received by the receiving antennas 16 from radio frequency to baseband frequency. Also, the radio units 18, which are provided with AGC (Automatic Gain Control) therein, make such adjustment that the amplitudes of the baseband signals become those within the dynamic range of A-D conversion units 20.

The A-D conversion units 20 carry out analog-to-digital conversion for the baseband signals. The sampling rate for the analog-to-digital conversion may be arbitrary, but it is assumed here that sampling is done at intervals equal to ½ of the FFT point interval.

The correlation processing units 22 perform correlation processing on the signals sampled by the A-D conversion units 20 in relation to previously stored signals. Here the correlation processing units 22 are assumed to have a matched filter structure. In the burst format as shown in FIG. 2, at least for the preamble, which is a known signal, a waveform in the time domain of the preamble is stored in advance in a memory (not shown), and a correlation with the sampled signal is calculated using the stored waveform. It is to be noted that the stored waveform is in units of 1 OFDM symbol or in FFT size. Thus, the electric power of the correlation values becomes large when the timing of the signal sampled by the A-D conversion units 20 is nearly synchronous with the timing of the signal stored in advance.

The power computing units 24 compute the powers of the correlation values outputted from the correlation processing units 22. The detectors 26 detect the peaks of the power values of the correlation values. It is to be noted here that the correlation value corresponding to the larger of the peaks of the power values of the two correlation values is called a main signal and the other corresponding to the smaller thereof a sub-signal, which are determined by the inter-signal condition determining unit 28. For the sake of simplicity, it is assumed here that the correlation value corresponding to the first detector 26a is called the main signal and the other corresponding to the second detector 26b the sub-signal.

The inter-signal condition determining unit 28 compares the relation between the peak of the main signal and the peak of the sub-signal against the first condition, and excludes the baseband signal corresponding to the sub-signal from signals on which the combining diversity is to be performed when the relation does not satisfy the first condition. This will be explained by referring to FIGS. 3A and 3B. FIGS. 3A and 3B illustrate waveforms of signals to be processed by the inter-signal condition determining unit 28. In these illustrations, the horizontal axis represents time and the vertical axis represents power values. Whereas FIG. 3A shows the changes and variations of the waveform of the main signal with time, FIG. 3B shows the changes and variations of the waveform of the sub-signal with time. The peak of the main signal detected by the first detector 26a is denoted by "P1", and the peak of the sub-signal detected by, the second detector 26b by "P2". It is to be noted also that errors of sampling timing are not taken into consideration in FIGS. 3A and 3B.

The above-mentioned first condition is to be: "P2 is present in four each of FFT point intervals set before and after P1". In FIG. 3B, four each of FFT point intervals set before and after P1 are represented by $\Delta T$, and if P2 is present in $\Delta T$, then it is determined that the first condition has been met. In FIG. 3B, however, P2 is outside the $\Delta T$ and therefore the first condition is not met. As a result, the inter-signal condition determining unit 28 excludes the baseband signal corresponding to the sub-signal from signals on which the combining diversity is to be performed, and communicates it to a combining/selective switching unit 34 to be described later. The inter-signal condition determining unit 28 may determine the main signal and the sub-signal based on the peaks detected by the detectors 26 and communicate it to the combining/selective switching unit 34.

Figure 4A:
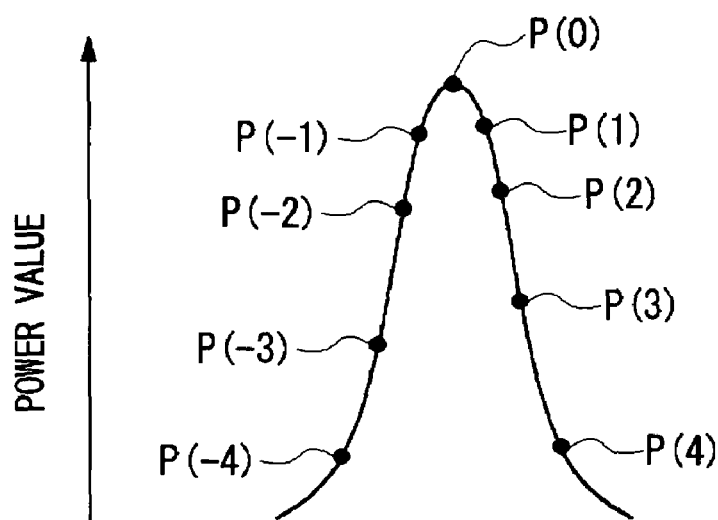
FIGS. 4A and 4B illustrate each a waveform of a signal to be processed by an intra-signal condition determining unit.
Figure 4B:
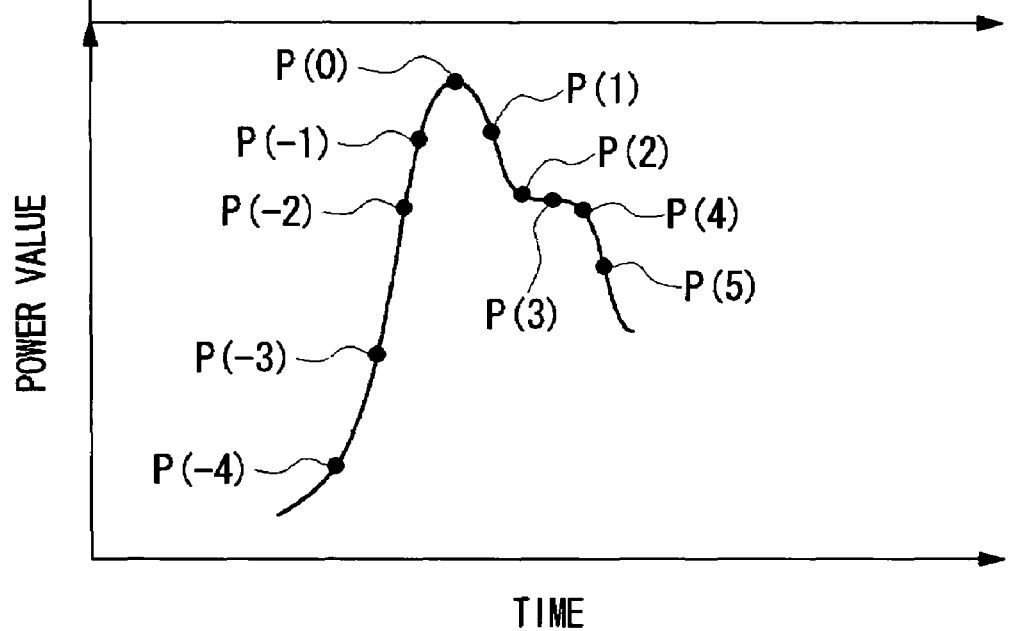

Referring back to FIG. 1, the intra-signal condition determining unit 30 compares a main signal and a sub-signal, respectively, against the second condition when a baseband signal corresponding to the sub-signal has not been excluded from the signals, on which the combining diversity is to be performed, by the inter-signal condition determining unit 28, and excludes any of the signals, which do not satisfy the second condition, from the combining diversity. This will be explained by referring to FIGS. 4A and 4B. FIGS. 4A and 4B illustrate each a waveform of a signal to be processed by the intra-signal condition determining unit 30. Also, FIGS. 4A and 4B show each changes and variations of the waveform of a main signal or sub-signal with time. In FIG. 4A and FIG. 4B, P(0) corresponds to the peak, P(-1) corresponds to the power value of the timing one FFT point interval before the peak, and P(1) corresponds to the power value of the timing one FFT point interval after the peak. It is to be noted also that errors of sampling timing are not taken into consideration in FIGS. 4A and 4B.

The above-mentioned second condition is to be: "The power values at timings 3, 4 and 5 FFT points before and after P(0) are all smaller than ¼ of the power value at P(0)". That is, the power values at P(-5), P(-4), P(-3), P(3), P(4) and P(5) including those not shown are smaller than ¼ of the power value at P(0). In FIGS. 4A and 4B, the power values are in dB (decibels). In FIG. 4A, the power values at P(-3) and P(3) are both smaller than ¼ of the power value at P(0). Accordingly, at P(4) and others, the power values, which are lower than those at P(-3) and P(3), are naturally smaller than ¼ of the power value at P(0). As a result, the waveform as shown in FIG. 4A satisfies the second condition. In FIG. 4B, on the other hand, the power values at P(3) is not smaller than ¼ of the power value at P(0). As a result, the waveform as shown in FIG. 4B does not satisfy the second condition, and baseband signals corresponding to waveforms like this are excluded from the combining diversity. The intra-signal condition determining unit 30 communicates it to a combining/selective switching unit 34 to be described later.

Figure 5:
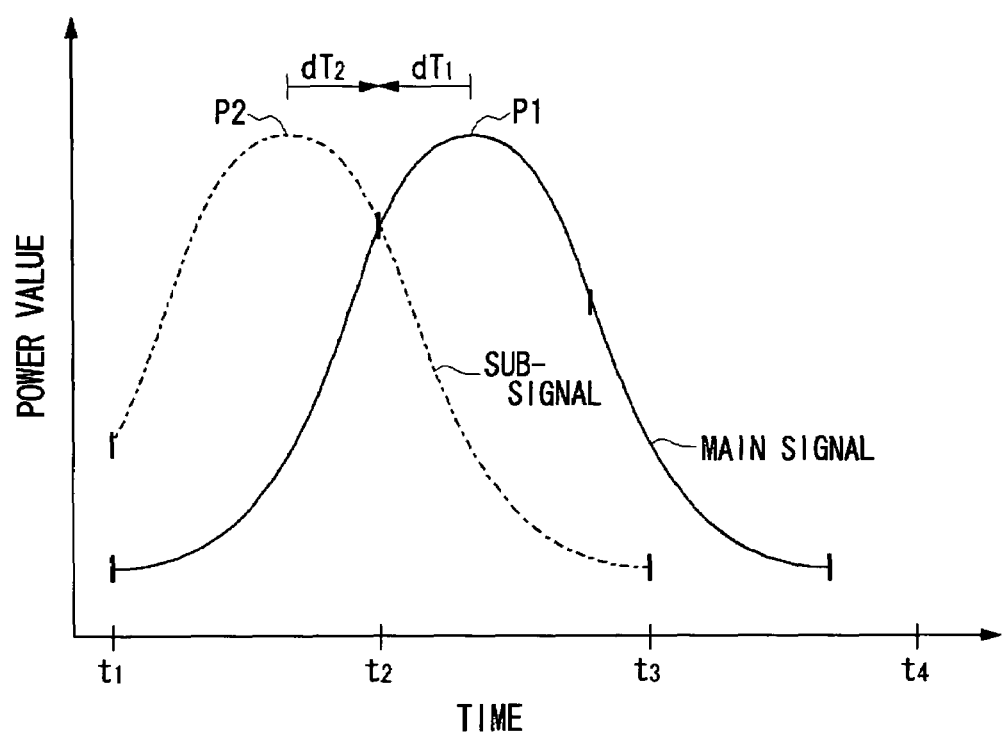
FIG. 5 illustrates waveforms of signals to be processed by a timing adjusting unit shown in FIG. 1.

Referring back to FIG. 1, the timing adjusting unit 32 makes such adjustment as to bring the timing of a sub-signal closer to the timing of a main signal when the baseband signals corresponding to the main signal and the sub-signal have not been excluded from the combining diversity as a result of processing by the intra-signal condition determining unit 28. Before this is explained, signals to be processed by the timing adjusting unit 32 are explained by referring to FIG. 5. FIG. 5 illustrates waveforms of signals to be processed by the timing adjusting unit 32. In FIG. 5, the waveforms of a main signal and a sub-signal are respectively shown and their respective peaks are denoted by "P1" and "P2". And the timings of sampling by the A-D conversion unit 20 are denoted by $t_1$ to $t_4$. In other words, this case represents a case where timing error of sampling is involved because no sampling is done at the timings corresponding to the peaks of the main signal and the sub-signal.

With the main signal in FIG. 5, the power value reaches a maximum for the timing of "$t_2$". With the sub-signal, too, the power value reaches a maximum for the timing of "$t_2$". As a result, the timing error for the sampling of the main signal will be $dT_1$ as shown, and the timing error for the sampling of the sub-signal will be $dT_2$ as shown. When a diversity is carried out, these errors will be superposed to become $dT_1+dT_2$. As described earlier, the transmission characteristics of signals deteriorate with larger $dT_1+dT_2$, so that the timing adjusting unit 32 shifts the sub-signal as appropriate. That is, the timing adjusting unit 32 shifts the sub-signal in such a manner that the power value of the sub-signal at $t_2$ may be the power value at $t_3$.

Here the power value for the timing corresponding to the peak of power value of the sampled main signal, that is, the timing "$t_1$", which is one FFT point before "$t_2$", is called a first power value, and the power value for the timing "$t_3$", which is one FFT point after "$t_2$", is called a second power value. Also, the power value for the timing corresponding to the peak of power value of the sampled sub-signal, that is, the timing "t1", which is one FFT point before "$t_2$", is called a third power value, and the power value for the timing "$t_3$", which is one FFT point after "$t_2$", is called a fourth power value. And the following Length1 through Length4 are calculated from the first to fourth power values.

Length1=First power value+Third power value

Length2=First power value+Fourth power value

Length3=Second power value+Fourth power value

Length4=Second power value+Third power value (Eq. 5)

Further, the following first value and second value re calculated from Length1 through Length4.

First value=Length1−Length3

Second value=Length2−Length4 (Eq.6)

Figure 6A:
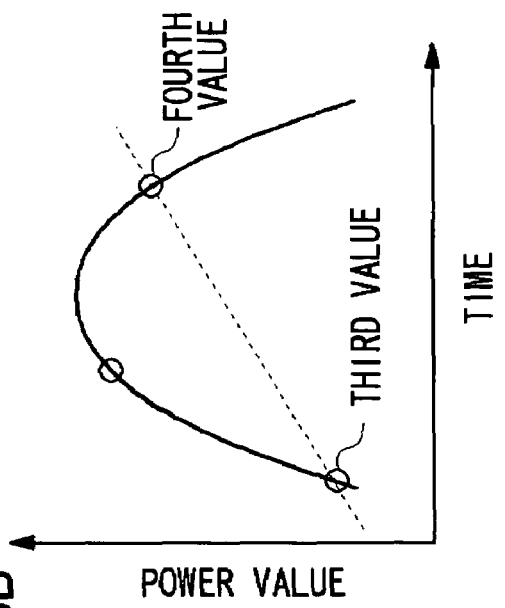
FIGS. 6A to 6D outline the processing by a timing adjusting unit in FIG. 1.
Figure 6B:
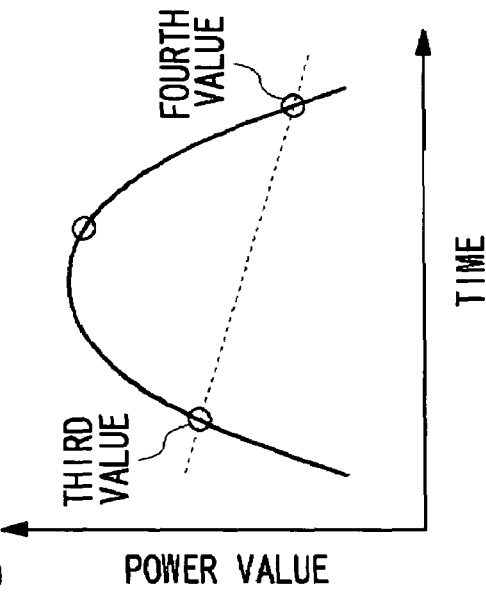

Further, the timing adjusting unit 32 decides on the shifting of the sub-signal when the second value is larger than the first value. This will now be explained qualitatively, using FIGS. 6A to 6D. FIGS. 6A to 6D outline the processing by a timing adjusting unit 32 shown in FIG. 1. Here FIG. 6A corresponds to FIG. 6B, and FIG. 6C to FIG. 6D. FIGS. 6A and 6B represent a case where the second value does not become larger than the first value, with FIG. 6A corresponding to a main signal and FIG. 6B corresponding to a sub-signal. As is clear from Equations 5 and 6 above, the first value will be larger if the slope of the line between the first power value and the second power value is in the same direction as that of the line between the third power value and the fourth power value. In such a case, the slopes take forms as shown in FIGS. 6A and 6B, indicating a high degree of agreement in timing between the main signal and the sub-signal. In other words, the first value indicates the degree of agreement in timing between the main signal and the sub-signal. In this case, there is no need for timing adjustment between the main signal and the sub-signal.

Figure 6C:
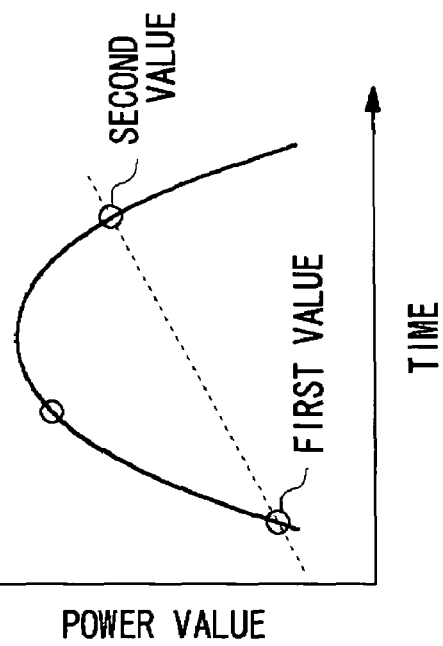
Figure 6D:
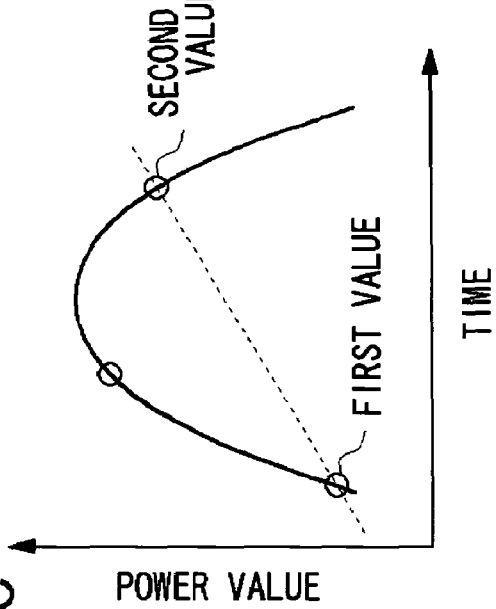

On the other hand, FIGS. 6C and 6D represent a case where the second value is larger than the first value, with FIG. 6C corresponding to a main signal and FIG. 6D corresponding to a sub-signal. As is clear from Equations 5 and 6, the second value will be larger if the slope of the line between the first power value and the second power value is in a reverse direction from that of the line between the third power value and the fourth power value. In such a case, the slopes take forms as shown in FIGS. 6C and 6D, indicating a low degree of agreement in timing between the main signal and the sub-signal. In other words, the first value indicates the degree of difference in timing between the main signal and the sub-signal.

Where shifting of a sub-signal has been decided, a shifting to an FFT point, which is one point after, is decided for a sampled signal corresponding to the sub-signal if the following condition is met:

$$Length2 > \frac{1}{2} Length4 \quad (Eq. 7)$$

On the other hand, for a sampled signal corresponding to the sub-signal, a shifting to an FFT point, which is one point before, is decided.

$$Length4 > \frac{1}{2} Length2 \quad (Eq. 8)$$

When one of the following conditions is met, an exclusion from the combining diversity is decided for a baseband signal corresponding to the sub-signal. The timing adjusting unit 32 communicates the above information to the combining/selective switching unit 34.

$$\left| Length2 - \frac{1}{2} Length4 \right| < 32 length2 \quad (Eq. 9)$$

$$\left| Length4 - \frac{1}{2} Length2 \right| < 32 length4$$

Referring back to FIG. 1, the combining/selective switching unit 34 decides the execution of selective diversity when it receives the notification from the inter-signal condition determining unit 28, the intra-signal condition determining unit 30 and the timing adjusting unit 32, and outputs to the diversity processing unit 38 one group of the signals inputted from the A-D conversion unit 20. Where no notification is received from the inter-signal condition determining unit 28, the intra-signal condition determining unit 30 and the timing adjusting unit 32, one corresponding to the main signal out of the signals inputted from the A-D conversion unit 20 is outputted to the diversity processing unit 38 based on the notification concerning the main signal having been received from the inter-signal condition determining unit 28.

The shift unit 36 shifts the timing of a sampled signal corresponding to the sub-signal based on the notification from the timing adjusting unit 32. The diversity processing unit 38 carries out a diversity processing. That is, the diversity processing unit 38 synthesizes two inputted signals and outputs the result in the case of combining diversity or outputs a single inputted signal as it is in the case of selective diversity. The FFT unit 40 carries out an FFT on inputted signals and outputs the results.

In terms of hardware, the above-described structure can be realized by a CPU, a memory and other LSIs of an arbitrary computer. In terms of software, it can be realized by memory-loaded programs which have managing and scheduling functions or the like, but drawn and described herein are function blocks that are realized in cooperation with those. Thus, it is understood by those skilled in the art that these function blocks can be realized in a variety of forms such as by hardware only, software only or the combination thereof.

Figure 7:
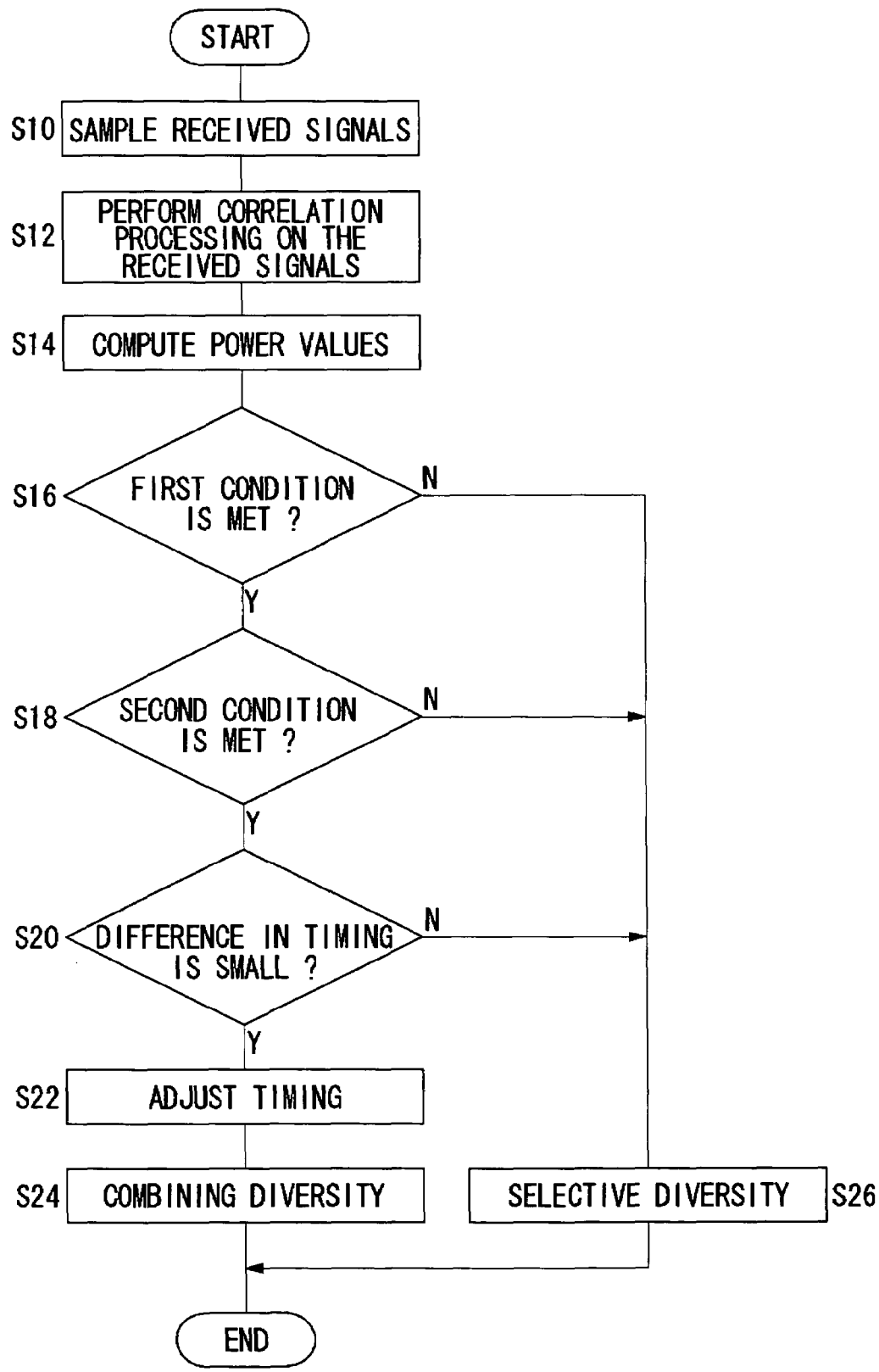
FIG. 7 shows a procedure for diversity processing by a receiving apparatus shown in FIG. 1.

FIG. 7 shows a procedure for diversity processing by a receiving apparatus 12. The A-D conversion unit 20 samples a plurality of received signals at predetermined timings (SIO). The correlation processing units 22 perform a correlation processing on a plurality of sampled received signals (S12). Power computing units 24 compute power values for a plurality of correlated received signals (S14). An inter-signal condition determining unit 28 compares the power values against the first condition. If the power values satisfy the first condition (Y of S16), an intra-signal condition determining unit 30 compares the power values against the second condition. And if the power values satisfy the second condition (Y of S18), the intra-signal condition determining unit 30 detects the difference in timing of the plurality of correlated received signals. And if the difference is small (Y of S20), the intra-signal condition determining unit 30 and the shift unit 36 adjust the timing (S22). The diversity processing unit 38 carries out a combining diversity (S24). On the other hand, if the power values do not satisfy the first condition (N of S16) or if the power values do not satisfy the second condition (N of S18) or if the timing difference is not small (N of S20), the combine/select switching unit 34 and the diversity processing unit 38 carry out a selective diversity (S26).

According to the first embodiment of the present invention, when received signals to be subjected to a combining diversity have wide difference in the timing corresponding to the peaks of the power values, they are excluded from the combining diversity, thus preventing the deterioration of communication quality of signals. Also, when there are significant effects of preceding waves or delayed waves contained in received signals to be subjected to a combining diversity, those signals are excluded from the combining diversity, thus preventing the deterioration of communication quality of signals. Moreover, the error of sampling timing among received signals to be subjected to a combining diversity is reduced, thus preventing the deterioration of communication quality of signals. It is to be noted here that the term "preceding waves" may be replaced by other commonly used term such as "advance waves" or "leading waves".

Second Embodiment

A second embodiment of the present invention, which is similar to the first embodiment, relates to a receiving apparatus that carries out diversity processing. However, the second embodiment differs from the first embodiment in the processing in the second stage. In the second stage of the present embodiment, when the relation of power values of peaks of a plurality of correlated signals does not satisfy a new first condition, some of the plurality of the received signals are excluded from the candidates for combining diversity because synthesis of the plurality of received signals corresponding thereto may worsen the signal quality.

Figure 8A:
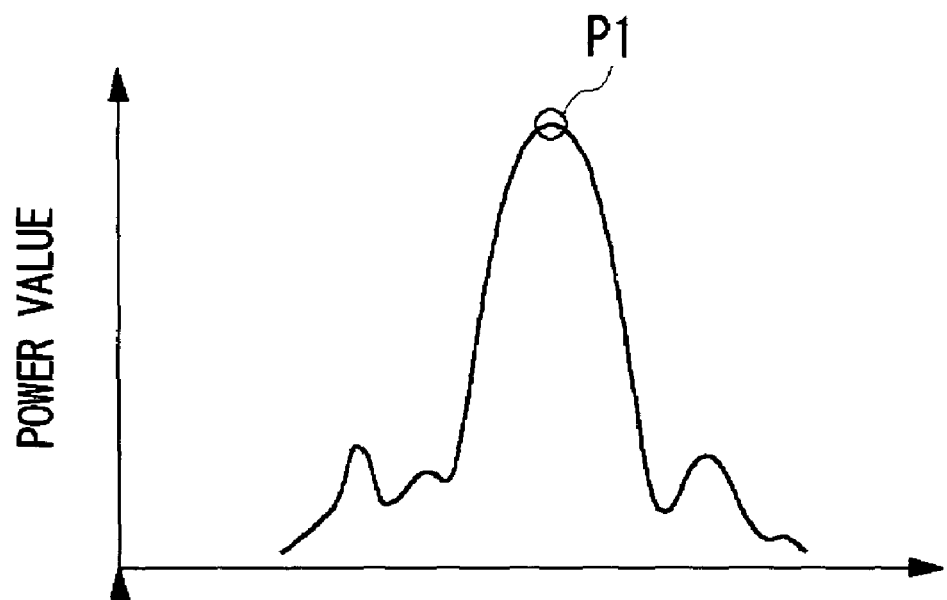
FIGS. 8A and 8B illustrate waveforms of signals to be processed by an inter-signal condition determining unit according to a second embodiment of the present invention.
Figure 8B:
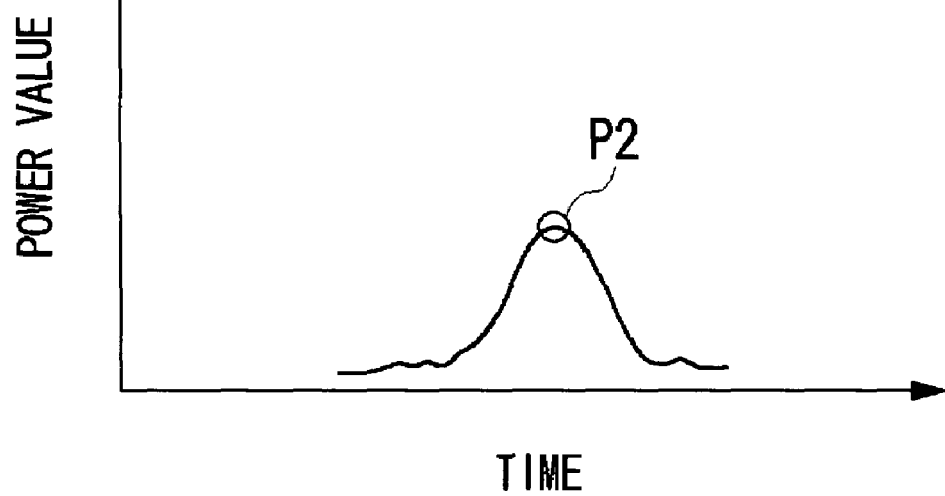

The second embodiment relates to a type of receiving apparatus 12 as shown in FIG. 1. The processing by an inter-signal condition determining unit 28, however, differs from one according to the first embodiment. The inter-signal condition determining unit 28 compares the relation between the peak of a main signal and the peak of a sub-signal against the first condition, and exclude a baseband signal corresponding to the sub-signal from combining diversity when said relation does not satisfy the first condition. This will be explained by referring to FIGS. 8A and 8B. FIGS. 8A and 8B illustrate waveforms of signals to be processed by the inter-signal condition determining unit 28. Whereas FIG. 8A shows the changes and variations of the waveform of the main signal with time, FIG. 8B shows the changes and variations of the waveform of the sub-signal with time. The peak of the main signal detected by a first detector 26a is denoted by "P1", and the peak of the sub-signal detected by a second detector 26b by "P2". It is to be noted here that errors of sampling timing are not taken into consideration in FIGS. 8A and 8B. The above first condition is to be: "The power value of P2 is larger than ½ of the power value of P1". Here, the power value of P2 is smaller than ½ of the power value of P1, so that the baseband signal corresponding to the sub-signal is excluded from combining diversity and this exclusion is communicated to a combining/selective switching unit 34.

According to the second embodiment of the present invention, when the peaks of the power values of received signals to be subjected to a combining diversity are small, those signals are excluded from the combining diversity, thus preventing the deterioration of communication quality of signals.

The present invention has been described based on the embodiments which are only exemplary. It is understood by those skilled in the art that there exist other various modifications to the combination of each component and process described above and that such modifications are encompassed by the scope of the present invention.

In the first and second embodiments of the present invention, the receiving apparatus 12 carries out combining diversity on a plurality of sampled signals. The embodiments, however, are not limited thereto, and the receiving apparatus 12 may perform adaptive array signal processing, for instance. In such a case, the receiving apparatus 12 may be added with a function for computing the receiving weight vectors necessary for adaptive array signal processing. In such a modification, the quality of signal transmission can be further improved. In other words, any modification may be considered feasible as long as a plurality of signals can be synthesized.

Although the present invention has been described by way of exemplary embodiments and modifications, it should be understood that many changes and substitutions may further be made by those skilled in the art without departing from the scope of the present invention which is defined by the appended claims.

What is claimed is:

1. A timing adjusting apparatus, comprising:
   a sampling unit which samples respectively a plurality of received signals at predetermined timings;
   a correlation processing unit which performs a correlation processing respectively on the plurality of sampled received signals by predetermined signals;
   a power computing unit which respectively computes power values of a main signal and sub-signals where one of the plurality of correlation-processed received signals is selected as the main signal and signals other than the main signal among the plurality of correlation-processed signals are the sub-signals;
   a detector which detects respectively a peak of the computed power value of the main signal and a peak of the computed power value of the sub-signals;
   an acquiring unit which acquires power values respectively corresponding to before and after the timing of the detected peak of the detected power value of the main signal, and which acquires power values respectively corresponding to before and after the timing of the detected peak of the power value of the sub-signals;
   a derivation unit which derives, based on the respective power values acquired by said acquiring unit, a first value indicating the degree of agreement between timings of the main signal and the sub-signals and a second value indicating the degree of variance between the timings of the main signal and the sub-signals; and
   a shift unit which shifts timing of received signals corresponding to the sub-signals, among the plurality of sampled received signals, based on the second value derived by said derivation unit if the derived second value is greater than the derived first value.

2. A timing adjusting apparatus according to claim 1, wherein if power values at timings corresponding to before and after the timing of the peak for the main signal are defined as a first power value and a second power value, respectively, and power values at timings corresponding to before and after the timing of the peak for the sub-signal are defined as a third power value and a fourth power value, respectively, the derivation unit derives the first value and the second value where the first value is to become larger as the slope of a line between the third power value and the fourth power value agrees with the slope of a line between the first power value and the second power value and where the second value is to become larger as the slopes are in reversed direction.

3. A timing adjusting apparatus according to claim 2, wherein said derivation unit derives, as the first value, the absolute value of a result in which the second power value and the fourth power value are subtracted from the sum of the first power value and the third power value, and derives, as the second value, the absolute value of a result in which the second power value and the third power value are subtracted from the sum of the first power value and the fourth power value and wherein said shift unit shifts timing of received signals corresponding to the sub-signals, based on the magnitude of the sum of the first power value and the fourth power value and the magnitude of the sum of the second power value and the third power value among the second values derived.

4. A timing adjusting apparatus according to claim 2, wherein said shift unit shifts the timing corresponding to the sub-signals to an after-timing if a value obtained after an operation has been done to the sum of the second power value and the third power value is smaller than the sum of the first power value and the fourth power value whereas said shift unit shifts the timing corresponding to the sub-signals to an before-timing if a value obtained after an operation has been done to the sum of the first power value and the fourth power value is smaller than the sum of the second power value and the third power value.

5. A timing adjusting apparatus according to claim 2, wherein said shift unit processes, as an invalid signal, a received signal corresponding to the sub-signal if the absolute value of a result obtained in a manner such that the value obtained after an operation has been done to the sum of the second power value and the third power value is subtracted from the sum of the first power value and the fourth power value or a result obtained in a manner such that the value obtained after an operation has been done to the sum of the first power value and the fourth power value is subtracted from the sum of the second power value and the third power value is smaller than a predetermined value.

6. A diversity receiving apparatus, comprising:
a sampling unit which samples respectively a plurality of received signals at predetermined timings;
a correlation processing unit which performs a correlation processing respectively on the plurality of sampled received signals by predetermined signals;
a power computing unit which respectively computes power values of a main signal and sub-signals where one of the plurality of correlation-processed received signals is selected as the main signal and signals other than the main signal among the plurality of correlation-processed signals are the sub-signals;
a detector which detects respectively a peak of the computed power value of the main signal and a peak of the computed power value of the sub-signals;
an inter-signal condition determining unit which excludes, from signals on which diversity is to be performed, a received signal corresponding to a sub-signal if a relation of the detected peak of the power value of the main signal and the detected peak of the power value of a sub-signal does not satisfy a first condition;
an intra-signal condition determining unit which compares the peak of the computed power value of the main signal and the peak of the computed power value of the sub-signals to a second condition, respectively, if a received signal corresponding to a sub-signal is not excluded from signals on which diversity is to be performed and which excludes, from signals on which diversity is to be performed, a signal corresponding to the main signal or a sub-signal if there is the main signal or a sub-signal that does not satisfy the second condition;
a timing adjusting unit which adjusts the timing of a received signal, among the plurality of sampled received signals, corresponding to a sub-signal if received signals corresponding to the main signal and a sub-signal are not excluded from signals on which diversity is to be performed; and
a diversity processing unit which performs a diversity processing on a received signal corresponding to the main signal and a timing-adjusted received signal, among the plurality of sampled received signals.

7. A diversity receiving apparatus according to claim 6, wherein said inter-signal condition determining unit specifies, as the first condition, that a time difference between timing corresponding to the detected peak of the power value of the main signal and timing of the detected peak of the power value of the sub-signal is equal to or less than a predetermined threshold value.

8. A diversity receiving apparatus according to claim 6, wherein said inter-signal condition determining unit specifies, as the first condition, that a ratio of a power value corresponding to the detected peak of the power value of the sub-signal to a power value corresponding to the detected peak of the power value of the main signal is equal to or greater than a predetermined power ratio.

9. A diversity receiving apparatus according to claim 6, wherein said intra-signal condition determining unit specifies, as the second condition, that ratios of power values, for the main signal or the sub-signal, corresponding respectively to before- and after-timings of the timing of a peak to the power value at the peak are equal to or less than a predetermined power ratio.

10. A diversity receiving apparatus according to claim 7, wherein said intra-signal condition determining unit specifies, as the second condition, that ratios of power values, for the main signal or the sub-signal, corresponding respectively to before- and after-timings of the timing of a peak to the power value at the peak are equal to or less than a predetermined power ratio.

11. A diversity receiving apparatus according to claim 8, wherein said intra-signal condition determining unit specifies, as the second condition, that ratios of power values, for the main signal or the sub-signal, corresponding respectively to before- and after-timings of the timing of a peak to the power value at the peak are equal to or less than a predetermined power ratio.

12. A diversity receiving apparatus according to claim 6, wherein said timing adjusting unit includes:
an acquiring unit which acquires power values respectively corresponding to before and after the timing of the peak of the detected power value of the main signal, and which acquires power values respectively corresponding to before and after the timing of the peak of the detected power value of the sub-signals;
a derivation unit which derives, based on the respective power values acquired by said acquiring unit, a first value indicating the degree of agreement between timings of the main signal and the sub-signals and a second value indicating the degree of variance between the timings of the main signal and the sub-signals; and
a shift unit which shifts timing of received signals corresponding to the sub-signals, among the plurality of sampled received signals, based on the second value derived by said derivation unit if the derived second value is greater than the derived first value.

13. A diversity receiving apparatus according to claim 12, wherein when power values at timings corresponding to before and after the timing of the peak for a main signal are defined as a first power value and a second power value, respectively, and power values for the sub-signals at timings corresponding to before and after the timing of the peak for a sub-signal are defined as a third power value and a fourth power value, respectively, said derivation unit derives the first value which is to become larger as the slope of a line between the third power value and the fourth power value agrees with the slope of a line between the first power value and the second power value and the second value which is to become larger as the slopes are in reversed directions.

14. A diversity receiving apparatus according to claim 13, wherein said derivation unit derives, as the first value, the absolute value of a result in which the second power value and the fourth power value are subtracted from the sum of the first power value and the third power value, and derives, as the second value, the absolute value of a result in which the second power value and the third power value are subtracted from the sum of the first power value and the fourth power value and wherein said shift unit shifts timing of received signals corresponding to the sub-signals, based on the magnitude of the sum of the first power value and the fourth power value and the magnitude of the sum of the second power value and the third power value among the second values derived.

15. A diversity receiving apparatus according to claim 13, wherein said shift unit shifts the timing corresponding to the sub-signals to an after-timing if a value obtained after an operation has been done to the sum of the second power value and the third power value is smaller than the sum of the first power value and the fourth power value whereas said shift unit shifts the timing corresponding to the sub-signals to a before-timing if a value obtained after an operation has been done to the sum of the first power value and the fourth power value is smaller than the sum of the second power value and the third power value.

16. A diversity receiving apparatus according to claim 13, wherein said shift unit processes, as an invalid signal, a received signal corresponding to the sub-signal if the absolute value of a result obtained in a manner such that the value obtained after an operation has been done to the sum of the second power value and the third power value is subtracted from the sum of the first power value and the fourth power value or a result obtained in a manner such that the value obtained after an operation has been done to the sum of the first power value and the fourth power value is subtracted from the sum of the second power value and the third power value is smaller than a predetermined value.

17. A timing adjusting method, comprising:
sampling respectively a plurality of received signals at predetermined timings;
performing a correlation processing respectively on the plurality of sampled received signals by predetermined signals;
computing respectively power values of a main signal and sub-signals where one of the plurality of correlation-processed received signals is selected as the main signal and signals other than the main signal among the plurality of correlation-processed signals are the sub-signals;
detecting respectively a peak of the computed power value of the main signal and a peak of the computed power value of the sub-signals;
acquiring power values respectively corresponding to before and after the timing, from timing corresponding to the detected peak of the power value of the main signal, and acquiring power values respectively corresponding to before and after the timing, from timing corresponding to the detected peak of the power value of the sub-signals;
deriving, based on the respective power values acquired by said acquiring, a first value indicating the degree of agreement between timings of the main signal and the sub-signals and a second value indicating the degree of variance between the timings of the main signal and the sub-signals; and
shifting timing of received signals corresponding to the sub-signals, among the plurality of sampled received signals, based on the second value derived by said deriving if the derived second value is greater than the first value.

18. A diversity receiving method, comprising:
sampling respectively a plurality of received signals at predetermined timings; performing a correlation processing respectively on the plurality of sampled received signals by predetermined signals;
computing respectively power values of a main signal and sub-signals where one of the plurality of correlation-processed received signals is selected as the main signal and signals other than the main signal among the plurality of correlation-processed signals are the sub-signals;
detecting respectively a peak of the computed power value of the main signal and a peak of the computed power value of the sub-signals; excluding, from signals on which diversity is to be performed, a received signal corresponding to a sub-signal if a relation of the detected peak of the power value of the main signal and the detected peak of the power value of a sub-signals does not satisfy a first condition; comparing the peak of the computed power value of the main signal and the peak of the computed power value of the sub-signals to a second condition, respectively, if a received signal corresponding to the sub-signal is not excluded, from signals on which diversity is to be performed, and excluding, from signals on which diversity is to be performed, a signal corresponding to the main signal or a sub-signal if there is the main signal or the sub-signal that does not satisfy the second condition; adjusting the timing of a received signal, among the plurality of sampled received signals, corresponding to a sub-signal if received signals corresponding to the main signal and the sub-signal are not excluded from signals on which diversity is to be performed; and
performing a diversity processing on a received signal corresponding to the main signal and a timing-adjusted received signal, among the plurality of sampled received signals.

* * * * *